United States Patent Office 3,480,471
Patented Nov. 25, 1969

3,480,471
PROCESS FOR THE MANUFACTURE OF PRE-IMPREGNATED WEBS
Karl-Heinz Rembold, Arlesheim, Switzerland, assignor to Ciba Limited, Basel, Switzerland, a company of Switzerland
No Drawing. Filed May 16, 1966, Ser. No. 550,108
Claims priority, application Switzerland, May 22, 1965, 7,146/65
Int. Cl. B44d *1/09;* C08c *17/16*
U.S. Cl. 117—161        9 Claims

ABSTRACT OF THE DISCLOSURE

A process for the manufacture of pre-impregnated flat materials for the manufacture of laminates, wherein a porous flat material is impregnated with a solution containing
  (a) a pre-lengthened, still soluble epoxy resin obtained by reacting at an elevated temperautre a liquid to highly viscous epoxy compound having an epoxide equivalency greater than 1 and an epoxide content of over 2.0 1,2-epoxide equivalents per kg. with a curing agent which on reaction with the epoxy compound produces a certain drop in the epoxide content depending on the amount of its addition, the amount of the said curing agent being selected so that at least about 10 to at most about 70%, preferably from 15 to 40%, of epoxide groups present are consumed, with the proviso, however, that the epoxide content should not drop below 2.0 epoxide equivalents per kg. and the reaction is continued until the stage of a stable, pre-lengthened product is reached and all of the curing agent has been consumed,
  (b) a curing agent in an amount sufficient to ensure complete curing of the pre-lengthened epoxy resin (a), and
  (c) an organic solvent
and the impregnated flat material is then dried.

---

It is known to manufacture pre-impregnated webs containing epoxy resin by first impregnating the supporting material used with an epoxy resin solution containing a curing agent, and then evaporating the solvent by a heat treatment. The resulting impregnated webs (so-called "prepregs"), which have as a rule only a limited shelf life, are then pressed with the application of pressure and heat to form laminates.

For the final properties of the laminates it is often of advantage when it is possible to use in the manufacture of the prepregs a liquid epoxy resin having a relatively short-chain molecule, since in general such products are distinguished by improved thermostability in the cured state. To obtain after the impregnation non-tacky prepregs with such liquid resins, the drying operation must be extended. After the solvent has been evaporated the impregnated web is exposed for a certain period of time to a higher temperature, during which a portion of the curing agent reacts with the epoxy resin and the latter is converted into a higher-molecular, higher viscous to solid but still fusible "pre-lengthened" state (the so-called "B-stage"). However, with many epoxy resin+curing agent systems the curing reaction continues slowly even at room temperature, whereby the stability of the "prepregs" is adversely affected. This is particularly true, for example, with curing agent systems based on anhydrides of dicarboxylic or polycarboxylic acids so that such epoxy resin+polyanhydride curing agent systems do not come into consideration for the manufacture of storable prepregs, notwithstanding the other very desirable, good mechanical properties of laminates obtained therewith.

It has now been found that the disadvantages described above can be avoided to a large extent by pre-lengthening the liquid epoxy resin used for the manufacture of the prepregs by heating with a specific amount of curing agent, being less than 1 equivalent of the amount corresponding to the epoxide groups present, in a manner such that the resulting resin is still readily soluble in the usual organic solvents, for example in acetone, and that at the same time there are still sufficient cross-linkable epoxide groups available for the curing operation in the course of the manufacture of the laminate. This is the case when the pre-lengthening affects about 10 to 70%, preferably 15 to 40%, of the epoxide groups initially contained in the liquid resin. The resulting, pre-extended epoxy resins are semi-solid to solid and storable, provided that during the pre-lengthening reaction all reactive groups of the curing agent have been consumed. It is an essential feature of the present invention that prelengthened epoxy resins completely reacted with a shortfall of curing agent are used. The unstable, pre-lengthened resins—such as are obtained when more curing agent is added than is just sufficient to achieve the desired pre-lengthening and the pre-lengthening reaction is not finalized but simply terminated by rapid cooling or an addition of solvents—are unsuitable for use in the present invention. Apart from being insufficiently storable such epoxy resins, which still contain a residue of the curing agent which was used in the pre-lengthening reaction but has not completely reacted, have the disadvantage that in most cases it is impossible to use for the final curing of the prepreg, leading to the laminate, another curing agent without an interaction between the two curing agents occurring and having an undesirable effect upon the mechanical properties of the cured laminates.

Accordingly, the present invention provides a process for the manufacture of pre-impregnated flat materials for the manufacture of laminates, wherein a porous flat material is impregnated with a solution containing
  (a) a pre-lengthened, still soluble epoxy resin obtained by reacting at an elevated temperature a liquid to highly viscous epoxy compound having an epoxide equivalency greater than 1 and an epoxide content of over 2.0 1,2-epoxide equivalents per kg. with a curing agent which on reaction with the epoxy compound produces a certain drop in the epoxide content depending on the amount of its addition, the amount of the said curing agent being selected so that at least about 10 to at most about 70%, preferably from 15 to 40%, of the epoxide groups present are consumed, with the proviso, however, that the epoxide content should not drop below 2.0 epoxide equivalents per kg. and the reaction is continued until the stage of a stable, pre-lengthened product is reached and all of the curing agent has been consumed,
  (b) a curing agent in an amount sufficient to ensure complete curnig of the pre-lengthened epoxy resin (a), and
  (c) an organic solvent and the impregnated flat material is then dried.

The curing agent used for the manufacture of the pre-lengthened epoxy resin (a) and the curing agent (b) required to ensure complete curing in the manufacture of the laminates may be identical or different. In this connection it is surprising that even when the curing agents of the two steps are the identical substance, the process of this invention offers notable technical advantages over the known process in which webs are impregnated with a solution of an epoxy resin that has not been pre-lengthened and the amount of curing agent required to achieve complete curing, followed by the manufacture of a prepreg, only part of the curing agent reacting with the epoxy resin and the reaction then being interrupted before the impregnating resin has turned infusible.

The technical advantages achieved quite generally by the present process are above all the following: The pre-impregnated webs dry faster and remain storable for a longer time, a minor resin flow during pressing and the finished pressed panels have in general an improved dimensional stability.

In a preferred variant of the present invention different curing agents are used for the pre-lengthening reaction and for the curing of the laminates. Such curing agent combinations enable both the processing behaviour of the laminating resins and the properties of the final laminate to be further improved.

Thus, for example, it was observed that when the epoxy resins are pre-lengthened with anhydrides of dicarboxylic or polycarboxylic acids, especially those which have a beneficial effect upon the thermostability of the resins, followed by the application of suitable boron trifluoride adduct complexes in the final curing of the prepregs, laminates are obtained having particularly good electrical properties at elevated temperatures.

As curing agents for the pre-lengthening reaction there are quite generally suitable all compounds which on reaction with the epoxide groups of the resin cause a reproducible drop in the content of epoxide groups, the drop depending on the amount of curing agent added. On completion of this reaction the resulting higher-molecular products must be stable, that is to say, the reactivity of the curing agent employed in the pre-lengthening reaction must have been reduced so much that on further heating the extent of the consumption of epoxide groups is insignificant compared with the actual reaction, or that this consumption is of the same order of magnitude as is found when the pure epoxy resin, used as starting material, without addition of a curing agent, is subjected to comparable heating. As a rough rule the stability of the resulting, pre-extended epoxy resin should in each case be at least sufficient to ensure that after 10 hours' heating at 120° C. the drop in the number of epoxide groups present does not exceed 0.2 epoxide equivalent per kg. of resin.

Curing agents suitable for the pre-extending reaction are above all anhydrides of dicarboxylic and polycarboxylic acids such as, for example, phthalic, tetrahydrophthalic, hexahydrophthalic, methyl-hexahydrophthalic, endomethylene-tetrahydrophthalic, methyl-endomethylene-tetrahydrophthalic anhydride (= methyl nadic anhydride), hexachloro-endomethylenetetrahydrophthalic, succinic, adipic, maleic, allylsuccinic and dodecenyl-succinic acid anhydride; 7-allyl-bicyclo(2.2.1)-hept-5-ene-2,3-dicarboxylic acid anhydride, pyromellitic acid dianhydride, or mixtures of such anhydrides. Instead of the anhyrides there may be used the free polycarboxilic acids, for example hexahydrophthalic acid.

It is of advantage to use additionally an accelerator, such as a tertiary amine, or a salt of quaternary ammonium compound thereof, for example tris(dimethylaminomethyl)-phenol, benzyldimethylamine or benzyl dimethyl ammonium phenolate, tin (II) salts of carboxylic acids such as tin (II) octoate or alkali metal alcoholates, for example sodium hexylate.

As curing agents for use in the pre-lengthening reaction there are also suitable Lewis acids, for example Friedel-Crafts catalysts and especially adducts of boron trifluoride with phenols, amines or amides, such as the $BF_3$-monoethylamine complex, $BF_3$-piperidine complex, $BF_3$-pyridine complex or $BF_3$-dimethylformamide complex.

The reaction temperature to be used in the pre-lengthening reaction varies with the type of epoxy resin used and with the reactivity of the individual pre-lengthening curing agent. As a rule a temperature from 50° to 300° C., preferably from 60° to 160° C., is used. At these temperatures the curing agent needed for the pre-extension is added to the resin either in one lot or portionwise.

The epoxy compounds used for pre-lengthening are those which contain per mol more than one epoxide group and more than 2.0 epoxide equivalents per kg. and which are liquid to viscid at room temperature. Examples of suitable epoxy compounds are the following:

Alicyclic polyepoxide such as vinylcyclohexene dioxide, limonene dioxide, dicyclopentadiene dioxide, ethyleneglycol - bis(3,4 - epoxy-tetrahydrodicyclopentadien-8-yl) ether, (3,4-epoxy-tetrahydrodicyclopentadien-8-yl)glycidyl ether; compounds containing two epoxycyclohexyl residues such as diethyleneglycol-bis-(4,4-epoxy-cyclohexane carboxylate), bis-3,4-(epoxy-cyclohexylmethyl) succinate, 3,4 - epoxy-cyclohexylmethyl-3,4-epoxy-cyclohexane-carboxylate, 3,4-epoxy-6- methylcyclohexylmethyl-3,4-epoxy-6-methylcyclo-hexane carboxylate and 3,4-epoxy - hexahydrobenzal - 3,4 - epoxycyclohexane-1,1-dimethanol; polyglycidyl esters accessible by reacting polycarboxylic acids or cyanuric acids with epichlorohydrin, for example diglycidyl adipate, diglycidyl phthalate and triglycidyl isocyanurate; polyglycidyl ethers accessible by etherification of a dihydric or polyhydric alcohol or diphenol or polyphenol with epichlorohydrin or dichlorohydrin in the presence of alkali; these compounds may be derived from glycols, such as ethyleneglycol, 1,4-butyleneglycol, glycerol or especially from diphenols or polyphenols such as resorcinol, pyrocatechol, hydroquinone, phenol-formaldehyde condensation products of the resol or novolak type, bis-(para-hydroxyphenyl)-methane and especially from bis-(para-hydroxyphenyl) - dimethylmethane (= bisphenol A).

Special mention in this connection deserve polyglycidyl ethers of bisphenol A that are liquid at room temperature and contain 3.8 to 5.8 epoxide equivalents per kg., corresponding to the average formula

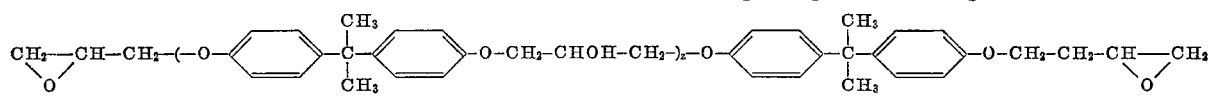

where $z$ is a small whole or fractional number from 0 to 2.

On completion of the pre-lengthening reaction up to 70% of the initially present epoxide groups may have been consumed, but the resin should still contain a residue of at least 2.0 epoxide equivalents per kg. Pre-lengthened epoxy resins in which fewer reactive groups are available for the final curing result in laminates whose interlays do not adhere well and their mechanical properties are considerably inferior.

As curing agent (b) to be added to the pre-lengthened epoxy resins (a) there may be used quite generally any one of the conventionally employed curing agents for epoxy resins, for example polyamines, polyamides, polycarboxylic acid anhydrides, Lewis acids, especially boron trifluoride complexes. However, preferred use is made of the same types of curing agents as are suitable for the manufacture of the pre-lengthened epoxy resins, and among them there are particularly suitable the complexes of boron trifluoride with amines or amides, such as monomethylamine, monoethylamine, piperidine, dimethylamine or benzylamine. According to a specially preferred variant of the invention an epoxy resin (a) pre-lengthened with a polycarboxylic acid anhydride is combined with a boron trifluoride amine complex as curing agent (b).

As organic solvent (c) for the preparation of the impregnating solutions there may be used the conventional solvents for impregnating resins, for example ketones such as acetone, methylethyl ketone, or methyl-isobutyl ketone; alcohols such as methanol, ethanol, or ether alcohols such as ethyleneglycol monomethyl ether; aromatic hydrocarbons such as toluene or xylene; or dimethylformamide.

Porous flat materials suitable for impregnation according to the present process may be, for example, woven, braided or knitted fabrics, fibre mats or fibre fleeces from fibrous materials. Relevant examples are paper, asbestos paper, mica papers, cottonwool, linen or cotton muslins, canvas and especially glass fibre mats or glass fibre fabrics.

Parts and percentages in the following examples are by weight.

Example 1

500 parts of a liquid epoxy resin, which has been obtained by condensing 2,2-bis - (4 - hydroxyphenyl)-propane and epichlorohydrin in the presence of alkali, having an epoxide equivalent of 192 and a viscosity of 11,000 centipoises at 25° C. (=epoxy resin A) are reacted with 50 parts of hexahydrophthalic anhydride and 1 part of benzyl-dimethylamine while being stirred for 3 hours at 100°C., during which the epoxide content drops from 5.2 to 4.1 epoxide equivalents per kg. Another 50 parts of hexahydrophthalic anhydride and 1 part of benzyldimethylamine are added and the batch is reacted for 5½ hours at 100° C., after which the residual epoxide content of the resin is 3.0 epoxide equivalents per kg. The resulting resin is solid at room temperature and still soluble in the conventional solvents. After having been stored for 4 weeks at 25° C., the resin no longer revealed any change in epoxide content. After having been heated for 10 hours at 120° C. an epoxide content of 2.81 epoxide equivalents per kg. was found, and this value did not change substantially when the resin was heated at 120° C. for a prolonged period of time.

The pre-lengthened resin obtained by 8½ hours' condensation was then mixed with 300 parts of hexahydrophthalic anhydride and 0.25 part of benzyldiemthylamine and dissolved in 300 parts of acetone.

A glass fabric, whose adhesion with the resin had been improved by treatment with an ammoniacal solution of a chromium chloride methacrylate complex with addition of polyvinylacetate and a wetting agent, was then impregnated witth the resulting epoxy resin solution. After drying for 12 minutes at 130° C., a non-tacky, flexible, pre-impregnated fabric having a resin content of 37% is obtained which can be stored for 26 hours at 60° C.

When 12 plies of this fabric are stacked in bundle form and pressed for 60 minutes at 160° C. under a pressure of 20 kg. per cm.², a resin flow (=loss in weight referred to the resin content) of 8% is measured. The resulting laminate is tough and hard (resin content: 34.0%) and reveals the following properties:

Flexural strength _____ kg./mm.²__ 65
Flexural strength after 1 hour's immersion in water
  at 100° C. _____ kg./mm.²__ 56
Water absorption after 1 hour at 100° __ percent__ 0.11

A comparable test performed with a fabric impregnated with a solution of 500 parts of epoxy resin A (as is), 400 parts of hexahydrophthalic anhydride and 2.25 parts of benzyldimethyl-amine in 300 parts of acetone required a drying time of 20 minutes at 130° C., and a dry, flexible prepreg was obtained having a resin content of 36%; its pot life at 60° C. was barely 10 hours. On being pressed for 1 hour at 160° C. under a pressure of 20 kg./cm.², a resin flow of about 16% was recorded.

Example 2

500 parts of the diepoxide of the acetal from Δ³-tetrahydrobenzaldehyde and 1,1 - bis-(hydroxymethyl)-cyclohexene-(3) of the formula

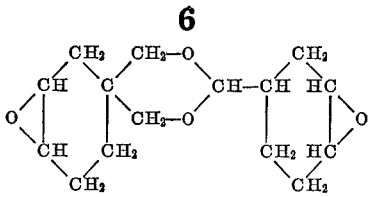

(= epoxy resin B) are mixed at 100° C. with 1 part of boron trifluoride monoethylamine complex with vigorous stirring. After 5 hours the reaction is complete, and the epoxide content of the resin (gram equivalents of epoxide groups per kg. resin) has dropped from 6.4 to 5.4. After further heating for 10 hours at 120° C., the epoxide content is still 5.30 and after a total of 37 hours' heating still 5.21 per kg. The resulting pre-lengthened resin, which is semi-solid at room temperature, has a viscosity of about 4000 centipoises at 80° C.; it is dissolved in 270 parts of acetone, and 15 parts of boron trifluoride monoethylamine complex are added. This solution is used for impregnating a glass fabric whose dressing contains aminopropyl triethoxy silane as adhesion promoter. To achieve a dry, non-tacky prepreg, drying for 5 minutes at 100° C. suffices. The resulting pre-impregnated fabric is storable for a prolonged period of time: Its pot life at room temperature is 5 months, at 40° C. over 2 months and at 60° C. 5 days.

12 plies of such a pre-impregnated fabric stored for 2 months at 40° C., are stacked to a bundle which is then pressed for 60 minutes at 160° C. under a pressure of 20 kg./cm.² and then after-hardened for 3 hours at 180° C. The resulting hard and tough laminate reveals the following properties:

Flexural strength _____ kg./mm.²__ 55
Flexural strength after 1 hour's immersion in water
  at about 100° C. _____ kg./mm.²__ 47.8
Water absorption after 1 hour's immersion in water
  at about 100° C. _____ percent__ 0.64
Impact strength _____ cm.kg./cm.²__ 156

A laminate manufactured in identical manner from a pre-impregnated fabric after storing for 5 months at room temperature, revealed the following properties:

Flexural strength after 1 hour's immersion in water
  at 100° C. _____ kg./mm.²__ 48
Water absorption after 1 hour's immersion in water
  at 100° C. _____ percent__ 0.9

When these fabrics were pressed, a resin flow of about 15% was recorded in each case.

A glass fabric impregnated in a comparative test with a solution of 500 parts of epoxy resin B (as is) and 16 parts of boron trifluoride monoethylamine complex in 270 parts of acetone had to be dried for 12 minutes at 100° C. to form a normal prepreg. This product had a shelf life of only 2 days at 60° C. and when stored for 5 months at room temperature and then pressed under a pressure of 20 kg./cm.² at 160° C., it no longer flowed so that it was unsuitable for the manufacture of laminates having good properties.

Example 3

25 parts of hexahydrophthalic anhydride and 2.5 parts of a solution of 0.82 part of sodium in 100 parts of 2,4-dihydroxy-3-methylolpentane are added at 100° C. to 500 parts of the epoxy resin B used in Example 2 [=diepoxide of the acetal from Δ³-tetrahydrobenzaldehyde and 1,1-bis-(hydroxymethyl) - cyclohexene - (3)]. This mixture is stirred and heated for 4 hours at 100° C., during which the epoxide content of the resin (gram equivalents of epoxide group per kg. of resin) drops from 6.3 to 5.42. After 38 hours' heating at 120° C. the residual epoxide content is 5.33. The resulting resin is semi-solid at room temperature and has a viscosity of about 3500 centipoises at 80° C. The recorded epoxide content had not changed after 5 months' storage at 25° C.

500 parts of the resulting pre-lengthened resin are dissolved in 270 parts of acetone and 15 parts of boron trifluoride monoethylamine complex are added. The resulting solution is used to impregnate a glass fibre fabric whose adhesion had been improved by treatment with an ammoniacal solution of a chromium methacrylate complex with addition of polyvinylacetate and a wetting agent. To achieve a non-tacky prepreg, drying for 8 minutes at 100° C. suffices. The resulting pre-impregnated fabric can be cut and stacked or stored on roller supports. At 60° C. it is storable for at least 66 days.

12 plies of the resulting impregnated fabric are stacked to form a bundle which is pressed for 60 minutes at 160° C. under a pressure of 20 kg./cm.$^2$ and then after-hardened for 3 hours at 180° C. The resulting hard, tough laminate has a resin content of about 35% and reveals the following electrical and mechanical properties:

| | |
|---|---|
| Flexural strength _____kg./mm.$^2$__ | 40 |
| Impact strength _____kg./mm.$^2$__ | 130 |
| Water absorption after 1 hour's immersion in water at 100° C. _____percent__ | 0.51 |
| Dielectric loss factor ($tg\delta$) at: | |
| 122° C. _____ | 0.01 |
| 137° C. _____ | 0.02 |
| 150° C. _____ | 0.03 |

In a comparative test a glass fibre fabric impregnated with a solution of 500 parts of epoxy resin B (as is) and 15 parts of boron trifluoride monoethylamine complex in 270 parts of acetone had to be dried for 12 minutes to achieve a non-tacky prepreg. Its shelf life is only for 29 days at 60° C.

When the product was pressed as described above, a laminate was obtained which revealed the following mechanical and electrical properties:

| | |
|---|---|
| Flexural strength _____kg./mm.$^2$__ | 35 |
| Water absorption after 1 hour's immersion in water at 100° C. _____percent__ | 0.9 |
| Dielectric loss factor ($tg\delta$) at: | |
| 90° C. _____ | 0.01 |
| 122° C. _____ | 0.02 |
| 134° C. _____ | 0.03 |

Example 4

500 parts of the pre-lengthened epoxy resin described in Example 3, containing 5.33 epoxide equivalents per kg., are mixed with 20 parts of difluoroboro-acetoacetanilide and 1.25 parts of triethylamine dissolved in 285 parts of acetone, and this solution is used for impregnating a glass fabric. The glass fabric has been dressed with a preparation containing a chromium methacrylate complex as adhesion promoter. A drying time of 9 minutes at 100° C. suffices. The resulting, flexible prepreg can be stored for 160 hours at 60° C.

12 plies of the prepreg are stacked in bundle form and pressed for 30 minutes at 120° C. under a pressure of 20 kg./mm.$^2$, then after-hardened for 60 minutes at 160° C., to form a tough, hard laminate which reveals the following properties:

| | |
|---|---|
| Flexural strength _____kg./mm.$^2$__ | 43 |
| Flexural strength during 1 hour's immersion in water at 100° C. _____kg./mm.$^2$__ | 38 |
| Impact strength _____cm.kg./cm.$^2$__ | 140 |
| Dielectric loss factor ($tg\delta$) at: | |
| 160° C. _____ | 0.01 |
| 190° C. _____ | 0.02 |
| 200° C. _____ | 0.03 |

A comparative test using a fabric impregnated with a solution of 100 parts of the epoxy resin B used in Example 3 and 4 parts of difluoroboro-acetoacetanilide, 925 parts of triethylamine and 57 parts of acetone, required drying for 27 minutes at 100° C. to obtain a dry prepreg which is brittle, has only little residual flexibility and a restricted shelf life. To manufacture a laminate having properties comparable with those described above, the fabric should be pressed not later than 4 days after its manufacture; its shelf life at 60° C. is only 17 hours.

Example 5

A mixture of 200 parts of an epoxy resin, which has been obtained by condensing 2,2-bis-(3,5-dibromo-4-hydroxyphenyl) - propane and epichlorohydrin, having an epoxide content of 2.53 epoxide equivalents per kg., with 300 parts of an epoxy resin, which has been obtained by condensing 2,2-bis-(4-hydroxyphenyl)-propane and epichlorohydrin having an epoxide content of 5.24 epoxide equivalents per kg. (epoxy resin mixture C; containing 4.1 epoxy equivalents per kg.) is heated to 100° C.; and in the course of 10 minutes 35 parts of hexahydrophthalic anhydride and 2 parts of benzyldimethylamine are stirred in. After having heated the mixture for 6 hours at 100° to 105° C., the epoxide content has dropped to 3.13 equivalents per kg., and this value does not change appreciably when heating at 120° C. is continued for some length of time.

500 parts of the resulting pre-lengthened epoxy resin mixture, which is semi-solid at room temperature, are mixed with 10 parts of difluoroboro-acetoacetanilide and 0.5 part of tribenzylamine in 270 parts of methylethyl ketone, and a glass fabric is impregnated with this solution. The glass fabric has been dressed with a preparation containing a chromium methacrylate complex as adhesion promoter. After drying for 35 minutes at 130° C. a flexible prepreg is obtained which can be stored at 60° C. for at least 60 days.

A stack of 12 plies of this prepreg is pressed for 60 minutes at 180° C. under a pressure of 20 kg./cm.$^2$ and gives rise to a tough, hard laminate.

A comparable test is performed using a fabric impregnated with a solution of 500 parts of the epoxy resin mixture C (as is), 10 parts of difluoroboro-acetoacetanilide and 0.5 part of tribenzylamine in 270 parts of methylethyl ketone which is likewise dried for 35 minutes at 130° C. The resulting prepreg can be stored at 60° C. for 72 hours.

Example 6

21.7 parts of hexahydrophthalic acid (=0.2 equivalent) are added with stirring at 120° C. in 2 equal portions at an interval of 60 minutes to 500 parts of the epoxy resin B used in Example 2 (=diepoxide of the acetal from Δ$^3$ - tetrahydrobenzaldehyde and 1,1-bis-(hydroxymethyl)-cyclohexene-(3). After 4 hours' reaction at 120° C. a clear resin is obtained which has an epoxide content of 4.81 equivalents per kg. At the same temperature a vacuum of about 15 mm. Hg is then applied for 1 hour. After cooling, a light-yellow, clear, solid resin is obtained which reveals a softening point of 67° C., an epoxide content of 4.49 equivalents per kg. and an acid content of 0.021 equivalent per kg.

500 parts of the resulting pre-lengthened solid resin are powdered and together with 370 parts of hexahydrophthalic anhydride and 60 parts of a solution of 0.82 part of sodium in 100 parts of 2,4-dihydroxy-3-methanolpentane dissolved in 240 parts of methylethyl ketone. A glass fabric is impregnated with this solution as described in the preceding example. After drying for 15 minutes at 120° C. a dry prepreg is obtained which can be stored at 60° C. for over 290 hours.

A bundle of 12 plies of this prepreg is pressed for 60 minutes at 180° C. under a pressure of 20 kg./cm.$^2$ and forms a tough, hard laminate.

A comparable test performed with a fabric impregnated with a mixture of 500 parts of the epoxy resin B (as is), 475 parts of hexahydrophthalic anhydride and 60 parts of a solution of 0.82 part of sodium in 100 parts of 2,4-dihydroxy-3-methylolpentane in 94.3 parts of methylethyl ketone and dried for 5 minutes at 160° C. yields a dry prepreg which can be stored at 60° C. for only 265 hours.

What is claimed is:

1. A process for the manufacture of a pre-impregnated flat structure which is suitable for the manufacture of laminates with the application of heat and pressure, which comprises impregnating a porous flat structure with an organic solution containing (a) a pre-lengthened, still soluble 1,2-epoxy resin, which has been obtained by reacting at an elevated temperature a fluid 1,2-epoxy compound having a 1,2-epoxide equivalency greater than 1 and a 1,2-epoxide content of over 2.0 1,2-epoxide equivalents per kg., with a curing agent selected from the group consisting of the anhydride of a carboxylic acid, anhydride of a polycarboxylic acid and a Lewis acid which on reaction with the 1,2-epoxy compound causes a defined drop of the 1,2-epoxide content said drop being proportional to the amount in which said curing agent is added, the amount of the said curing agent being selected so that at least about 10% to at most about 70% of the 1,2-epoxide groups present are consumed, without however the 1,2-epoxide content dropping below 2.0 1,2-epoxide equivalents per kg., and the reaction being continued until all of the curing agent has been consumed and the stage of a stable, pre-lengthened, still soluble product has been reached, (b) a curing agent selected from the group consisting of the anhydride of a carboxylic acid, anhydride of a polycarboxylic acid and a Lewis acid in an amount sufficient to ensure complete curing of the pre-lengthened 1,2-epoxy resin (a), and (c) an organic solvent, and drying the impregnated flat structure by evaporation of solvent (c).

2. A process according to claim 1, wherein a polycarboxylic anhydride is used as pre-lengthening curing agent for the manufacture of the pre-lengthened 1,2-epoxy resin (a).

3. A process according to claim 2, wherein a polycarboxylic anhydride in combination with a catalytic amount of a curing accelerator is used as pre-lengthening curing agent.

4. A process according to claim 3, wherein a member selected from the group consisting of a tertiary amine and an alkali metal alcoholate is used as curing accelerator.

5. A process according to claim 1, wherein a Lewis acid is used as pre-lengthening curing agent for the manufacture of the pre-lengthened 1,2-epoxy resin (a).

6. A process according to claim 5, wherein a boron trifluoride-amine complex is used as pre-lengthening curing agent.

7. A process according to claim 1, wherein a polycarboxylic acid anhydride is used as curing agent (b).

8. A process according to claim 1, wherein a boron trifluoride complex, is used as curing agent (b).

9. A process according to claim 8, wherein a polycarboxylic acid anhydride is used as pre-lengthening curing agent for the manufacture of the pre-lengthened 1,2-epoxy resin (a), and a boron trifluoride complex is used as curing agent (b).

References Cited

UNITED STATES PATENTS

| | | | |
|---|---|---|---|
| 2,839,495 | 6/1958 | Carey | 161—184 X |
| 2,902,398 | 9/1959 | Schroeder | 117—161 X |
| 3,004,931 | 10/1961 | Brueschweiler et al. | 117—161 X |
| 3,030,247 | 4/1962 | Schurb | 156—330 X |
| 3,214,324 | 10/1965 | Peerman | 260—47 X |
| 3,265,664 | 8/1966 | Fulmer et al. | 260—47 |

OTHER REFERENCES

Lee et al., Epoxy Resins, McGraw-Hill, New York, 1957, pp. 48–53, 116–118.

WILLIAM D. MARTIN, Primary Examiner

M. R. P. PERRONE, Jr., Assistant Examiner

U.S. Cl. X.R.

117—126, 140, 143, 155; 156—330; 260—47